(12) United States Patent
Kaneko et al.

(10) Patent No.: US 11,374,786 B2
(45) Date of Patent: Jun. 28, 2022

(54) GATEWAY DEVICE

(71) Applicant: Hitachi Automotive Systems, Ltd., Hitachinaka (JP)

(72) Inventors: Shuhei Kaneko, Hitachinaka (JP); Hitoshi Kawaguchi, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 16/972,908

(22) PCT Filed: May 15, 2019

(86) PCT No.: PCT/JP2019/019217
§ 371 (c)(1),
(2) Date: Dec. 7, 2020

(87) PCT Pub. No.: WO2019/239774
PCT Pub. Date: Dec. 19, 2019

(65) Prior Publication Data
US 2021/0250200 A1     Aug. 12, 2021

(30) Foreign Application Priority Data
Jun. 14, 2018 (JP) .............................. JP2018-113343

(51) Int. Cl.
*H04L 12/40* (2006.01)
*H04L 12/46* (2006.01)

(52) U.S. Cl.
CPC .... *H04L 12/40071* (2013.01); *H04L 12/4013* (2013.01); *H04L 12/4625* (2013.01);
(Continued)

(58) Field of Classification Search
CPC ........... H04L 12/40071; H04L 12/4013; H04L 12/4625; H04L 2012/40273; H04L 2012/40215
See application file for complete search history.

(56) References Cited

U.S. PATENT DOCUMENTS 5,285,389 A * 2/1994 Taylor ............... F16H 61/66259
477/49
5,935,197 A * 8/1999 Aldworth ............ G06F 15/8007
708/200

(Continued)

FOREIGN PATENT DOCUMENTS

JP      2006-352236 A      12/2006
JP      2008-527772 A       7/2008
(Continued)

OTHER PUBLICATIONS

International Search Report with English translation and Written Opinion issued in corresponding application No. PCT/JP2019/019217 dated Aug. 27, 2019.

*Primary Examiner* — Rasheed Gidado
(74) *Attorney, Agent, or Firm* — Foley & Lardner LLP (57) ABSTRACT

The invention realizes a gateway device capable of shortening the time required for routing to a CAN bus of the opposite microcomputer side and reducing the delay of data transfer. If the indexes are the same, a microcomputer 1 and a microcomputer 2 include common routing tables 10 and 20 in which the same contents are defined. The microcomputer 1 sends the index to the microcomputer 2. The microcomputer 2 that has received the index reads the routing rule defined in the common routing table 20 by the received index.

11 Claims, 8 Drawing Sheets

(52) U.S. Cl.
CPC ............... *H04L 2012/40215* (2013.01); *H04L 2012/40273* (2013.01)

(56) References Cited

U.S. PATENT DOCUMENTS

| | | | |
|---|---|---|---|
| 7,594,054 B2* | 9/2009 | Joos | G06F 13/385 |
| | | | 710/305 |
| 9,065,677 B2* | 6/2015 | Schrum, Jr. | H04L 45/66 |
| 9,806,895 B1* | 10/2017 | Kommula | H04L 49/201 |
| 2008/0049621 A1 | 2/2008 | McGuire | |
| 2013/0166778 A1* | 6/2013 | Ishigooka | H04L 67/12 |
| | | | 709/248 |
| 2016/0323386 A1* | 11/2016 | Wideman | H04L 67/12 |
| 2017/0155585 A1* | 6/2017 | Meng | H04L 45/745 |
| 2017/0163572 A1 | 6/2017 | Cheng | |
| 2017/0352198 A1* | 12/2017 | Hasegawa | G07C 5/008 |
| 2019/0068407 A1 | 2/2019 | Haga | |

FOREIGN PATENT DOCUMENTS

| | | |
|---|---|---|
| JP | 2009-071688 A | 4/2009 |
| JP | 2017-102349 A | 6/2017 |
| JP | 2017-526309 A | 9/2017 |
| JP | 2017-212724 A | 11/2017 |

* cited by examiner

| INDEX | CAN ID | RECEPTION CHANNEL NUMBER | TRANSMISSION CHANNEL NUMBER | TRANSMISSION CONTROL |
|---|---|---|---|---|
| #1 | 0x012 | CAN1 | CAN2 | CONTROL A |
| #2 | 0x123 | CAN2 | CAN1 | CONTROL A |
| #3 | 0x204 | CAN3 | CAN4 | CONTROL B |
| #4 | 0x240 | CAN4 | CAN3 | CONTROL B |
| #5 | 0x316 | CAN4 | CAN3 | CONTROL B |
| #6 | 0x3AB | CAN1 | CAN3 | CONTROL C |
| #7 | 0x440 | CAN2 | CAN4 | CONTROL C |
| #8 | 0x4CD | CAN3 | CAN1 | CONTROL D |
| #9 | 0x588 | CAN4 | CAN2 | CONTROL D |

| INDEX | CAN ID | RECEPTION CHANNEL NUMBER | TRANSMISSION CHANNEL NUMBER | TRANSMISSION CONTROL |
|---|---|---|---|---|
| #1 | 0x012 | CAN1 | CAN2 | CONTROL A |
| #2 | 0x123 | CAN2 | CAN1 | CONTROL A |
| #3 | 0x3AB | CAN1 | MICROCOMPUTER 2 | CONTROL C |
| #4 | 0x440 | CAN2 | MICROCOMPUTER 2 | CONTROL C |
| #5 | 0x4CD | MICROCOMPUTER 2 | CAN1 | CONTROL D |
| #6 | 0x588 | MICROCOMPUTER 2 | CAN2 | CONTROL D |

FIG. 9

| INDEX | CAN ID | RECEPTION CHANNEL NUMBER | TRANSMISSION CHANNEL NUMBER | TRANSMISSION CONTROL |
|---|---|---|---|---|
| #1 | 0x204 | CAN3 | CAN4 | CONTROL B |
| #2 | 0x240 | CAN4 | CAN3 | CONTROL B |
| #3 | 0x316 | CAN4 | CAN3 | CONTROL B |
| #4 | 0x3AB | MICROCOMPUTER 1 | CAN3 | CONTROL C |
| #5 | 0x440 | MICROCOMPUTER 1 | CAN4 | CONTROL C |
| #6 | 0x4CD | CAN3 | MICROCOMPUTER 1 | CONTROL D |
| #7 | 0x588 | CAN4 | MICROCOMPUTER 1 | CONTROL D |

GATEWAY DEVICE

TECHNICAL FIELD

The present invention relates to a gateway device that controls a communication network.

BACKGROUND ART

A vehicle is equipped with a plurality of electronic control units (ECUs) which are installed in various places in the vehicle. Each of the plurality of ECUs cooperates to realize one application. Therefore, each ECU is connected by a communication line to form a network, and data communication is performed between each ECU.

Since these ECUs are installed in various places in the vehicle, one in-vehicle network is configured by relaying communication between different networks configured for each installation place by an in-vehicle gateway device. CAN is widely used mainly as a communication protocol for in-vehicle networks.

Further, in recent years, the number of CAN (controller area network) channels required for in-vehicle gateway devices and ECUs has been increasing, and there is a situation in which one microcomputer cannot meet the demand. Therefore, a configuration is used in which two microcomputers are combined to meet the demand.

As described above, for example, a technique disclosed in PTL 1 is known as a technique including a plurality of communication interfaces.

PTL 1 discloses a gateway device which is connected to a bus of a first network in which a first type frame is transmitted according to a first communication protocol and a second network in which a second type frame is transferred according to a second communication protocol different from the first communication protocol. The gateway device includes a receiving unit that sequentially receives the first type frames from the bus of the first network, a determining unit that determines whether the data of the first type frame received by the receiving unit is to be transmitted to the second network, and a transmitting unit that transmits, to the second network, the second type frame containing each piece of data of the plurality of first type frames determined to be transmitted to the second network by the determining unit.

CITATION LIST

Patent Literature

PTL 1: JP 2017-212724 A

SUMMARY OF INVENTION

Technical Problem

However, in the configuration that combines two microcomputers according to the technology described in PTL 1, it is necessary to route the CAN frame to the CAN bus of the opposite microcomputer side, which increases the routing time and delays the data transfer.

The invention has been made in view of the above related art, and an object thereof is to realize a gateway device that can shorten the time required for routing to the CAN bus of the opposite microcomputer side and reduce the delay of data transfer.

Solution to Problem

In order to achieve the above object, the invention is configured as follows.

A gateway device includes a first arithmetic processing unit that includes a plurality of first communication channels, a second arithmetic processing unit that includes a plurality of second communication channels. The first arithmetic processing unit and the second arithmetic processing unit each include an information transmitting/receiving unit that transmits and receives information, and a common routing table that is defined with a routing rule.

Advantageous Effects of Invention

According to the invention, it is possible to realize a gateway device that can shorten the time required for routing to the CAN bus on the opposite microcomputer side and reduce the delay in data transfer.

DESCRIPTION OF EMBODIMENTS

Hereinafter, embodiments of the invention will be described with reference to the accompanying drawings. The following embodiments are examples in which the invention is applied to an in-vehicle gateway device mounted on a vehicle.

EMBODIMENTS

First Embodiment

Figure 1:
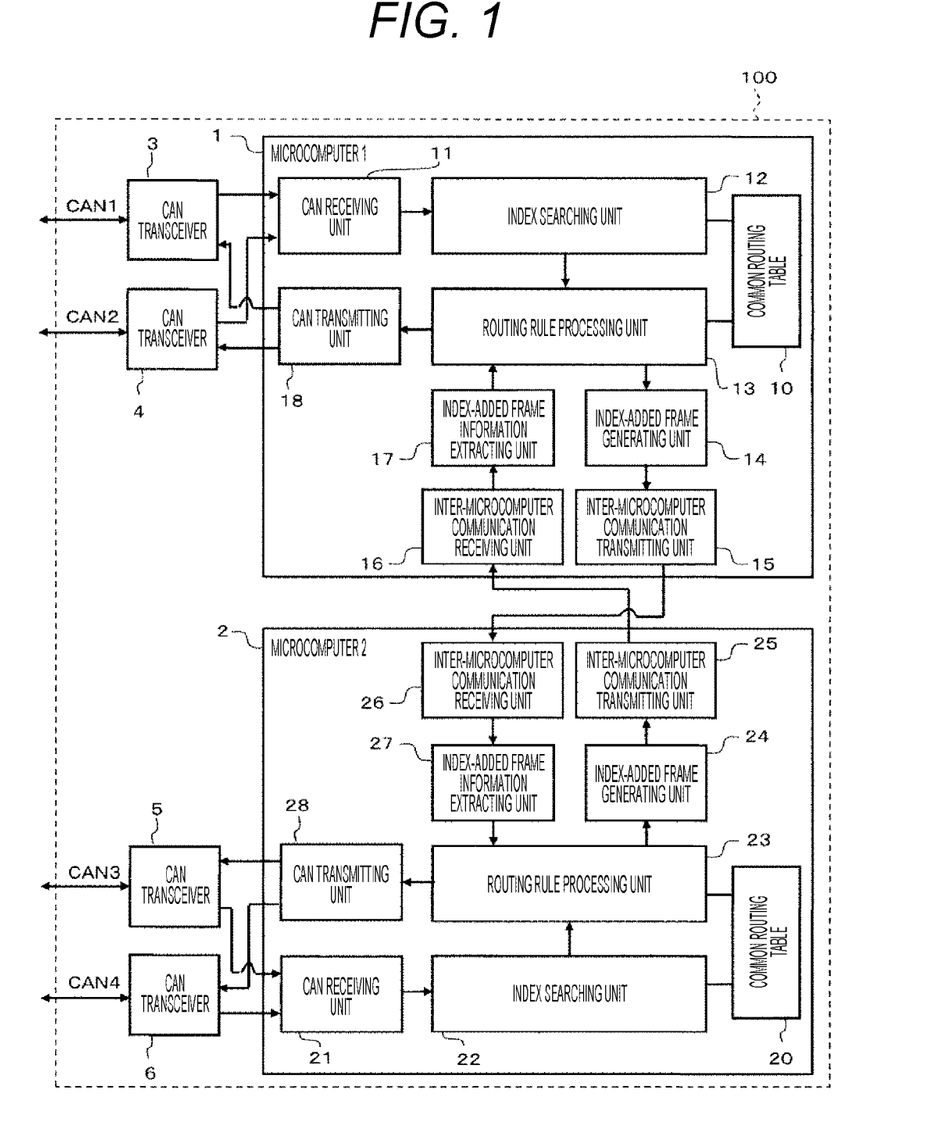
FIG. 1 is a functional block diagram schematically illustrating an overall configuration of an in-vehicle gateway device according to a first embodiment of the invention.

FIG. 1 is a functional block diagram schematically illustrating the overall configuration of an in-vehicle gateway device according to a first embodiment of the invention.

In FIG. 1, an in-vehicle gateway device 100 includes a microcomputer 1 (first arithmetic processing unit) having a plurality (for example, two) CAN channels (CAN1 and CAN2 (a plurality of first communication channels)), and a microcomputer 2 (second arithmetic processing unit) having a plurality (for example, 2) CAN channels (CAN3 and CAN4 (a plurality of second communication channels)), and CAN transceivers (a CAN transceiver 3, a CAN transceiver 4, a CAN transceiver 5, and a CAN transceiver 6) corresponding to the plurality of CAN channels. CAN stands for Controller Area Network.

Information is transmitted and received between the microcomputer 1 and the microcomputer 2 via a CAN bus.

The microcomputer 1 has a common routing table 10, and the microcomputer 2 has a common routing table 20. Similar routing rules are defined in the common routing tables 10 and 20.

Here, the routing table is a table containing information defined in each of a plurality of indexes, and a table in which routing rules such as a CAN ID, a reception channel number, a transmission channel number, and a transmission control method are defined for each index. The common routing table is a table that is provided in a plurality of microcomputers and has the same contents (routing rules) defined if the indexes are the same.

The routing table defines at least the CAN ID (controller area network identification code), the reception channel number, and the transmission channel number for each index.

The microcomputer 1 includes a CAN receiving unit 11 that performs a CAN frame receiving process, a CAN transmitting unit 18 that performs a CAN frame transmitting process, an index searching unit 12 that searches an index of the common routing table 10 from the CAN frame information received by the CAN receiving unit 11, a routing rule processing unit 13 that reads a routing rule with reference to the index hit by the index searching unit 12 and performs the process, an index-added frame generating unit 14 that generates an inter-microcomputer communication frame from the CAN frame information to which the information based on the index is added in a case where the routing rule hit by the index searching unit 12 is transferred to the microcomputer 2, an inter-microcomputer communication transmitting unit 15 that transmits the inter-microcomputer communication frame generated by the index-added frame generating unit 14 to the microcomputer 2, an inter-microcomputer communication receiving unit 16 that receives the inter-microcomputer communication frame transmitted from the microcomputer 2, and an index-added frame information extracting unit 17 that extracts the information based on the index and the received CAN frame information from the inter-microcomputer communication frame received by the inter-microcomputer communication receiving unit 16. The CAN receiving unit 11, the CAN transmitting unit 18, the inter-microcomputer communication transmitting unit 15, and the inter-microcomputer communication receiving unit 16 form an information transmitting/receiving unit. Similarly, a CAN receiving unit 21, a CAN transmitting unit 28, an inter-microcomputer communication transmitting unit 25, and an inter-microcomputer communication receiving unit 26 form an information transmitting/receiving unit.

The microcomputer 2 has the same configuration as that of the microcomputer 1, and includes the CAN receiving unit 21 that performs a CAN frame receiving process, the CAN transmitting unit 28 that performs a CAN frame transmitting process, an index searching unit 22 that searches an index of the common routing table 20 from the CAN frame information received by the CAN receiving unit 21, a routing rule processing unit 23 that performs a routing rule process with reference to the index hit by the index searching unit 22 and performs the process, an index-added frame generating unit 24 that generates an inter-microcomputer communication frame from the CAN frame information to which the information based on the index is added in a case where the routing rule hit by the index searching unit 22 is transferred to the microcomputer 1, the inter-microcomputer communication transmitting unit 25 that transmits the inter-microcomputer communication frame generated by the index-added frame generating unit 24 to the microcomputer 1, the inter-microcomputer communication receiving unit 26 that receives the inter-microcomputer communication frame transmitted from the microcomputer 1, and an index-added frame information extracting unit 27 that extracts the information based on the index and the received CAN frame information from the inter-microcomputer communication frame received by the inter-microcomputer communication receiving unit 26.

Figure 2:
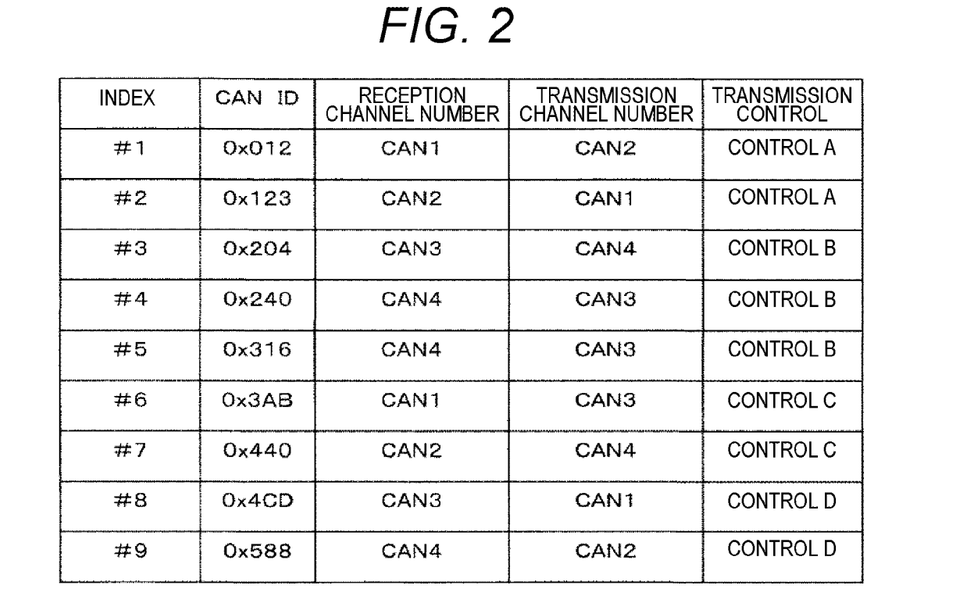
FIG. 2 is a diagram illustrating an example of a common routing table according to the first embodiment.

FIG. 2 is a diagram illustrating an example of the common routing tables 10 and 20 according to the first embodiment.

FIG. 2 exemplifies the routing rules of CAN frames received from CAN1, CAN2, CAN3, and CAN4, the CAN ID, the reception channel number, the transmission channel number, and the transmission control (transmission control process) are defined for indexes #1 to #9.

As illustrated in FIG. 2, for example, in index #6, when the CAN ID of the CAN frame received from CAN1 of the microcomputer 1 is 0x3AB, the transmission control C is processed and a routing rule is transmitted to CAN3 of the microcomputer 2.

In FIG. 2, control A in transmission control is control in the microcomputer 1, and control B is control in the microcomputer 2. Control C is transmission control from the microcomputer 1 to the microcomputer 2, and control D is transmission control from the microcomputer 2 to the microcomputer 1.

Figure 3:
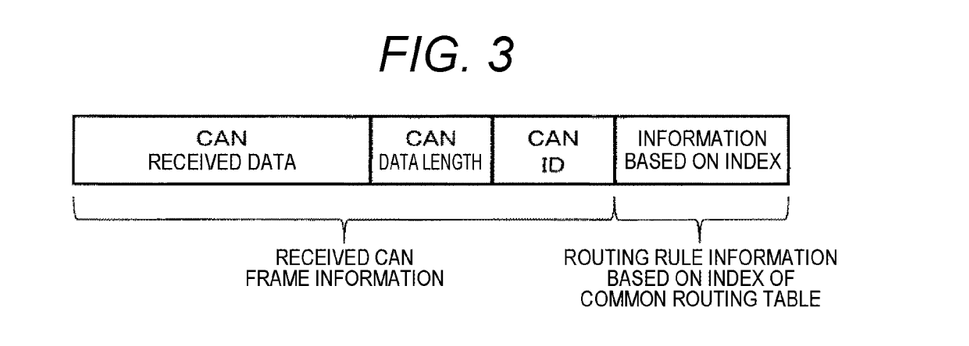
FIG. 3 is a diagram schematically illustrating an inter-microcomputer communication frame format according to the first embodiment.

FIG. 3 is a diagram schematically illustrating an inter-microcomputer communication frame format according to the first embodiment.

As illustrated in FIG. 3, the inter-microcomputer communication frame format includes received CAN frame information (CAN received data, CAN data length, and CAN ID) and information based on the index hit by the index searching unit 12 (routing rule information based on the index of the common routing table).

The operational effect of the first embodiment of the invention configured as described above will be described using an example of a configuration different from the invention as a comparative example.

Figure 7:
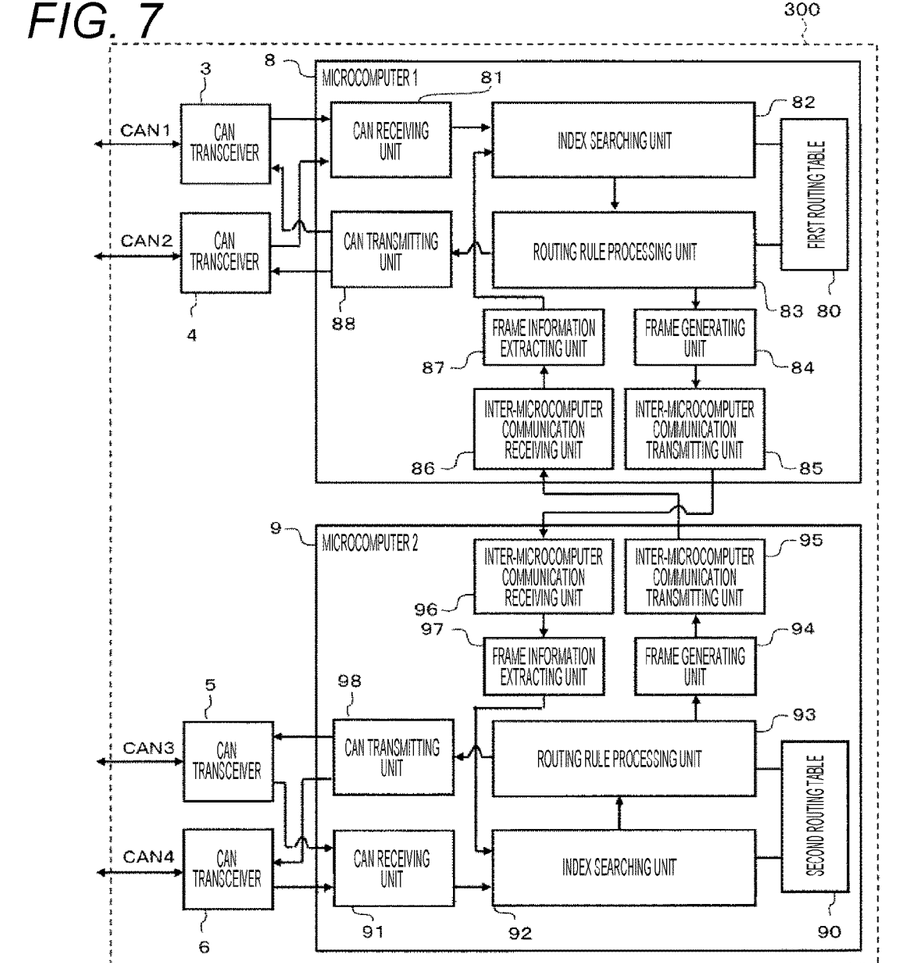
FIG. 7 is a functional block diagram schematically illustrating the overall configuration of an in-vehicle gateway device, which is a comparative example having a configuration different from that of the invention.
Figure 8:
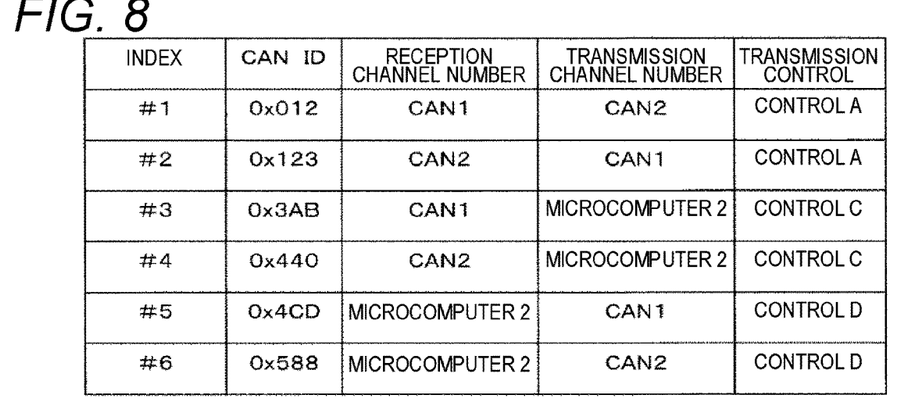
FIG. 8 is a diagram illustrating an example of a first routing table included in a microcomputer of a comparative example.
Figure 9:
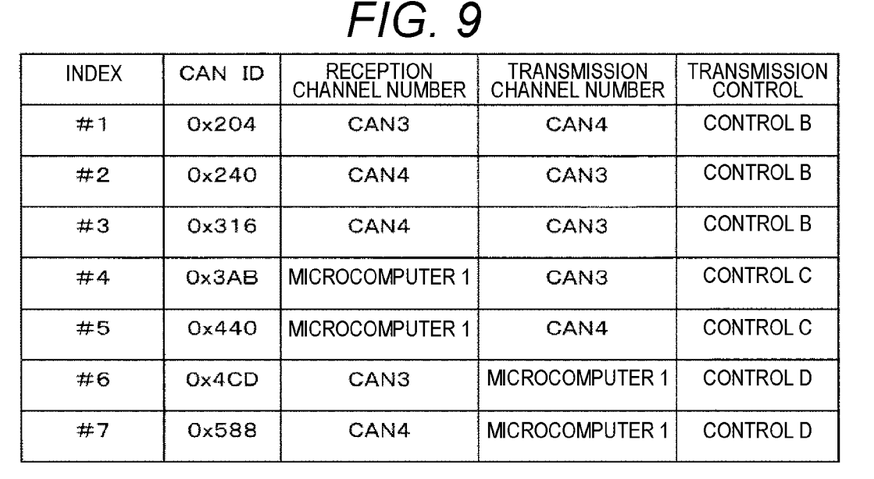
FIG. 9 is a diagram illustrating an example of a second routing table included in the microcomputer of the comparative example.
Figure 10:
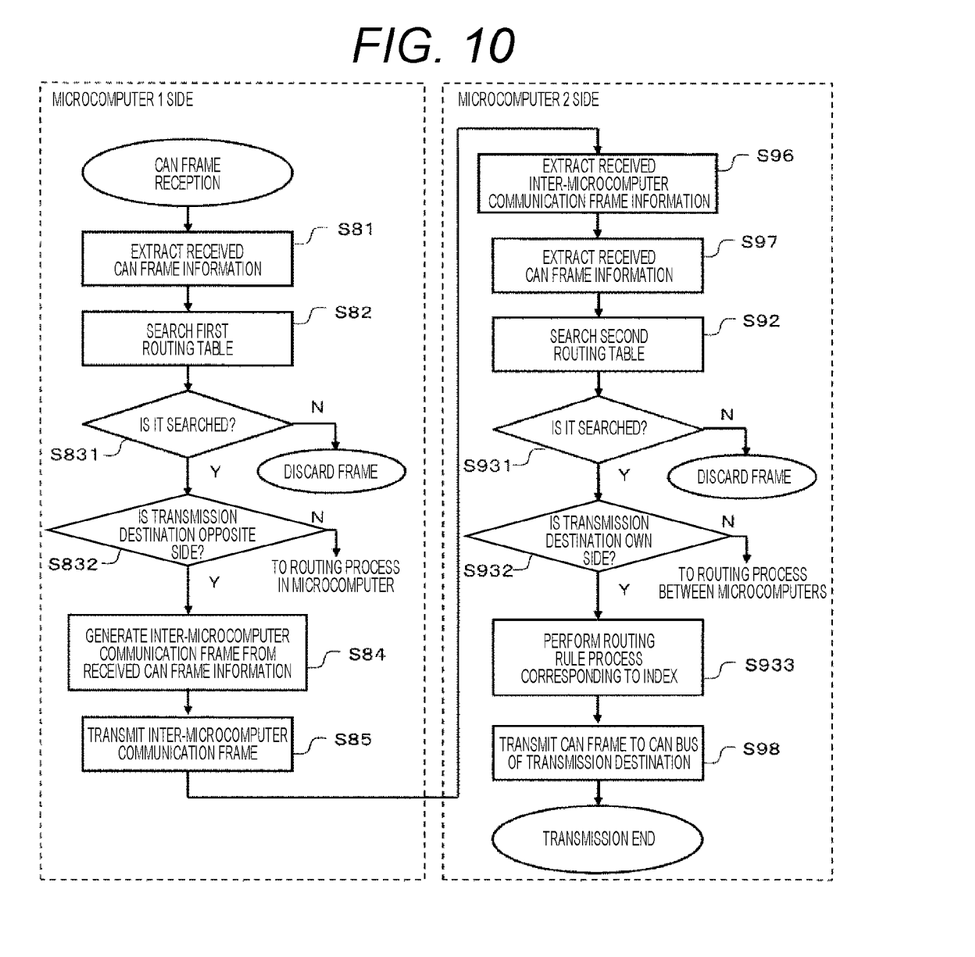
FIG. 10 is a flowchart schematically illustrating a routing process flow of the comparative example.

FIG. 7 is a comparative example having a configuration different from the invention, and is a functional block diagram schematically illustrating the overall configuration of the in-vehicle gateway device. FIG. 8 is a diagram illustrating an example of a first routing table included in a microcomputer 8 (microcomputer 1) of the comparative example. FIG. 9 is a diagram illustrating an example of a second routing table included in a microcomputer 9 (microcomputer 2) of the comparative example. Further, FIG. 10 is a flowchart schematically illustrating a routing process flow of the comparative example.

In FIG. 7, an in-vehicle gateway device 300 includes the microcomputer 8 that is the microcomputer 1 having a plurality of CAN channels (CAN1 and CAN2), the microcomputer 9 that is the microcomputer 2 having a plurality of CAN channels (CAN3 and CAN4), and a plurality of CAN transceivers (the CAN transceiver 3, the CAN transceiver 4, the CAN transceiver 5, and the CAN transceiver 6) corresponding to the plurality of CAN channels.

The microcomputer 1 has a first routing table 80, and the microcomputer 2 has a second routing table 90. Different routing rules are defined for the first routing table 80 and the second routing table 90.

The microcomputer 8 includes a CAN receiving unit 81 that performs a CAN frame receiving process, a CAN transmitting unit 88 that performs a CAN frame transmitting process, an index searching unit 82 that searches an index of a first routing table 80 from the CAN frame information received by the CAN receiving unit 81, a routing rule processing unit 83 that performs the routing rule process with reference to the index hit by the index searching unit 82, a frame generating unit 84 that generates an inter-microcomputer communication frame from the CAN frame information in a case where the routing rule hit by the index searching unit 82 is transferred to the microcomputer 9, an inter-microcomputer communication transmitting unit that transmits the inter-microcomputer communication frame generated by the index-added frame generating unit 84 to the microcomputer 9, an inter-microcomputer communication receiving unit 86 that receives the inter-microcomputer communication frame transmitted from the microcomputer 9, and a frame information extracting unit 87 that extracts and the received CAN frame information from the inter-microcomputer communication frame received by the inter-microcomputer communication receiving unit 86.

The microcomputer 9 is configured similarly to the configuration of the microcomputer 8, and includes a CAN receiving unit 91 that performs a CAN frame receiving process, a CAN transmitting unit 98 that performs a CAN frame transmitting process, an index searching unit 92 that searches an index of a second routing table 90 from the CAN frame information received by the CAN receiving unit 91, a routing rule processing unit 93 that performs the routing rule process with reference to the index hit by the index searching unit 92, a frame generating unit 94 that generates an inter-microcomputer communication frame in a case where the routing rule hit by the index searching unit 92 is transferred to the microcomputer 8, an inter-microcomputer communication transmitting unit 95 that transmits the inter-microcomputer communication frame generated by the index-added frame generating unit 94 to the microcomputer 8, an inter-microcomputer communication receiving unit 96 that receives the inter-microcomputer communication frame transmitted from the microcomputer 8, and a frame information extracting unit 97 that extracts and the received CAN frame information from the inter-microcomputer communication frame received by the inter-microcomputer communication receiving unit 96.

In the comparative example illustrated in FIGS. 7, 8, 9, and 10, in the configuration in which two microcomputers 8 and 9 are combined, for example, when the microcomputer 8 receives a CAN frame having 0x3AB as a CAN ID from CANT, the CAN receiving unit 81 extracts the received CAN frame information (Step S81 in FIG. 10). Then, the index searching unit 82 searches the index of the first routing table 80 from 0x3AB, which is the CAN ID included in the received CAN frame information (Step S82).

Next, the routing rule processing unit 83 refers to the fact that the destination indicated in the routing rule corresponding to index #3 (Step S831) searched and hit is CAN3 that the microcomputer 9 (the destination is the opposite-side microcomputer 9) (Step S832). The frame generating unit 84 generates an inter-microcomputer communication frame from the received CAN frame information (Step S84). Then, the inter-microcomputer communication transmitting unit 85 transmits the inter-microcomputer communication frame to the microcomputer 9 (Step S85 (transmission of inter-microcomputer communication frame)). In Step S831, if there is no hit (corresponding) index, the frame is discarded.

Further, in the microcomputer 9, the inter-microcomputer communication receiving unit 96 extracts the inter-microcomputer communication frame information (Step S96), and the frame information extracting unit 97 extracts 0x3AB, which is the CAN ID of the received CAN frame information included in the inter-microcomputer communication frame information (Step S97). Then, the index searching unit 92 searches the CAN ID for the index of the second routing table 90 (Step S92).

The routing rule processing unit 93 refers to the fact that the destination indicated in the routing rule corresponding to index #4 (Step S931) searched and hit is CAN3 included in the microcomputer 9 (Step S932), and performs a routing rule process corresponding to index #4 (Step S933). If there is no hit (corresponding) index in Step S931, the frame is discarded.

Then, the CAN transmitting unit 98 transmits the received CAN frame to CAN3 (Step S98). That is, when a CAN frame is routed from CAN1 of the microcomputer 8 to CAN3 of the microcomputer 9, the microcomputer 8 and the microcomputer 9 require an index searching process of the routing table (Steps S82, S831, S832, S92, S931, and S932). As a result, there is a problem in that the processing time required for routing increases and a delay time occurs.

The description will be given below about that the first embodiment of the invention can solve the problems of the comparative example illustrated in FIGS. 7 to 10.

Figure 4:
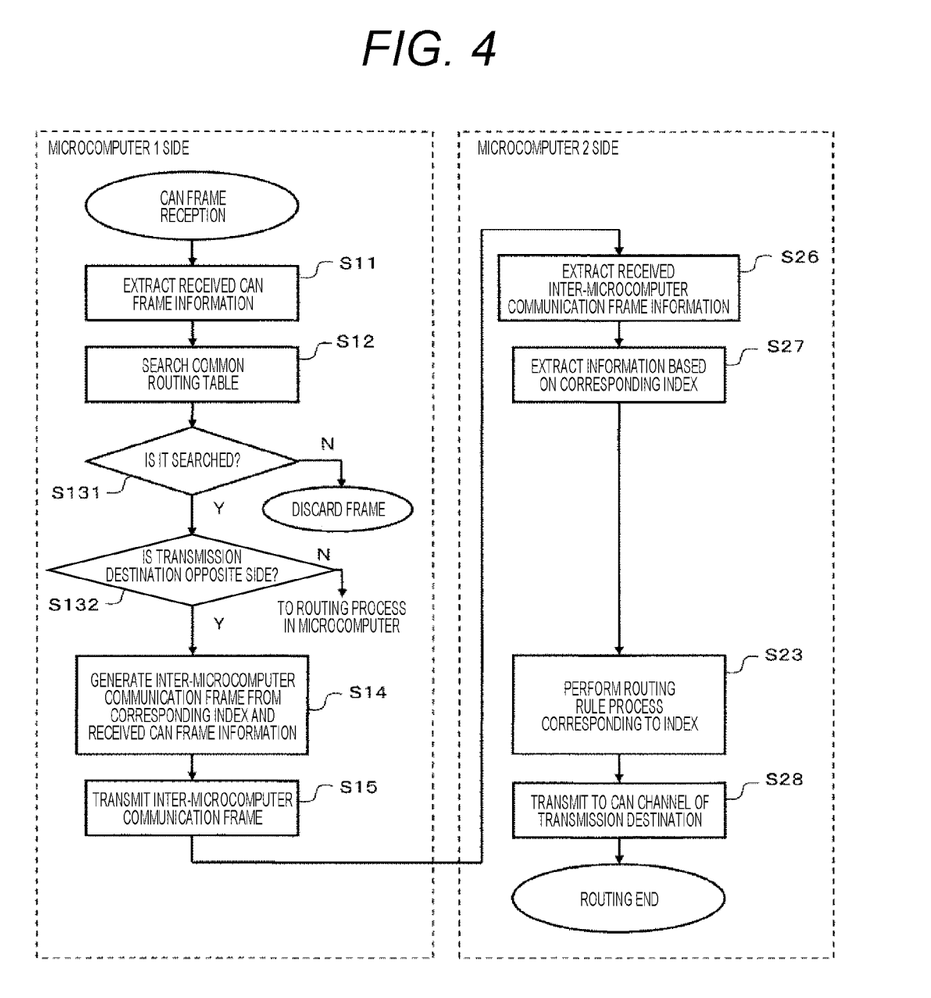
FIG. 4 is a flowchart illustrating a routing process flow in the first embodiment.

FIG. 4 is a flowchart illustrating the routing processing flow in the first embodiment of the invention. In the first embodiment, when a CAN frame having a CAN ID of 0x3AB is received from CAN1, the CAN receiving unit 11 extracts the received CAN frame information (Step S11), and the index searching unit 12 searches the index of the common routing table 10 from the CAN ID of 0x3AB included in the received CAN frame information (Step S12).

Then, the routing rule processing unit 13 refers to the fact that the destination indicated by the routing rule corresponding to index #6 (Step S131) searched and hit is CAN3 included in the microcomputer 2 (the destination is the opposite side) (Step S132). The index-added frame generating unit 14 generates an inter-microcomputer communication frame from the received CAN frame information added with index #6 which is searched and hit (Step S14). Thereby, transmission control is performed.

Then, the inter-microcomputer communication transmitting unit 15 transmits the inter-microcomputer communication frame to the microcomputer 2 (Step S15). Further, in the microcomputer 2, the inter-microcomputer communication receiving unit 26 extracts the received inter-microcomputer communication frame information (Step S26), and the index-added frame information extracting unit 27 extracts index #6 and the received CAN frame information included in the inter-microcomputer communication frame information (Step S27). Then, the routing rule processing unit 23 performs a process according to the routing rule corresponding to index #6 (Step S23), and the CAN transmitting unit 28 transmits the received CAN frame to CAN3 (Step S28).

That is, since the common routing tables 10 and 20 are provided for the microcomputer 1 and the microcomputer 2 respectively, and the received CAN frame information with the index searched and hit by the microcomputer 1 is passed to the microcomputer 2, the microcomputer 2 does not need to perform the index searching process of the common routing table 20, and it is possible to reduce delay time taken for routing from CANT of the microcomputer 1 to CAN3 of the microcomputer 2.

Since the processes corresponding to Steps S92, S931, and S932 illustrated in FIG. 10 in the comparative example are omitted from the flowchart illustrated in FIG. 4 in the first embodiment of the invention, these processes are unnecessary, and it is clear that the processing time can be shortened.

As described above, according to the first embodiment of the invention, if the indexes are the same, the common routing table in which the same contents are defined is provided in a plurality of microcomputers, and the indexes transmitted and received between the microcomputers are configured to refer to the common routing table. Therefore, it is possible to realize an in-vehicle gateway device that can shorten the time required for routing to the CAN bus of the opposite microcomputer side (opposing microcomputer) and reduce the delay of data transfer.

Second Embodiment

Next, a second embodiment of the invention will be described.

Although the first embodiment described above is an example of adding the index searched and hit itself, the second embodiment is an example of adding information based on the index searched and hit (for example, information CAN3 of the transmission channel number).

Figure 5:
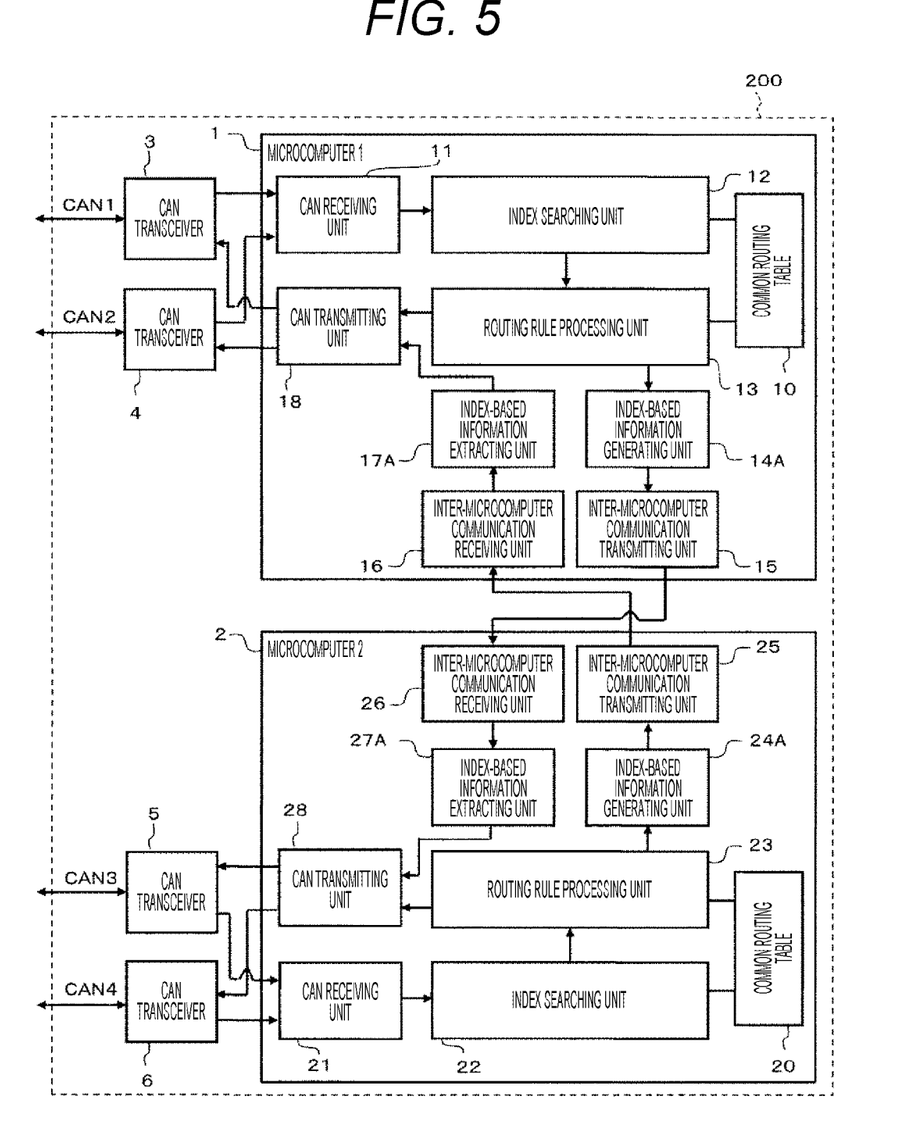
FIG. 5 is a functional block diagram schematically illustrating an overall configuration of the in-vehicle gateway device according to a second embodiment.
Figure 6:
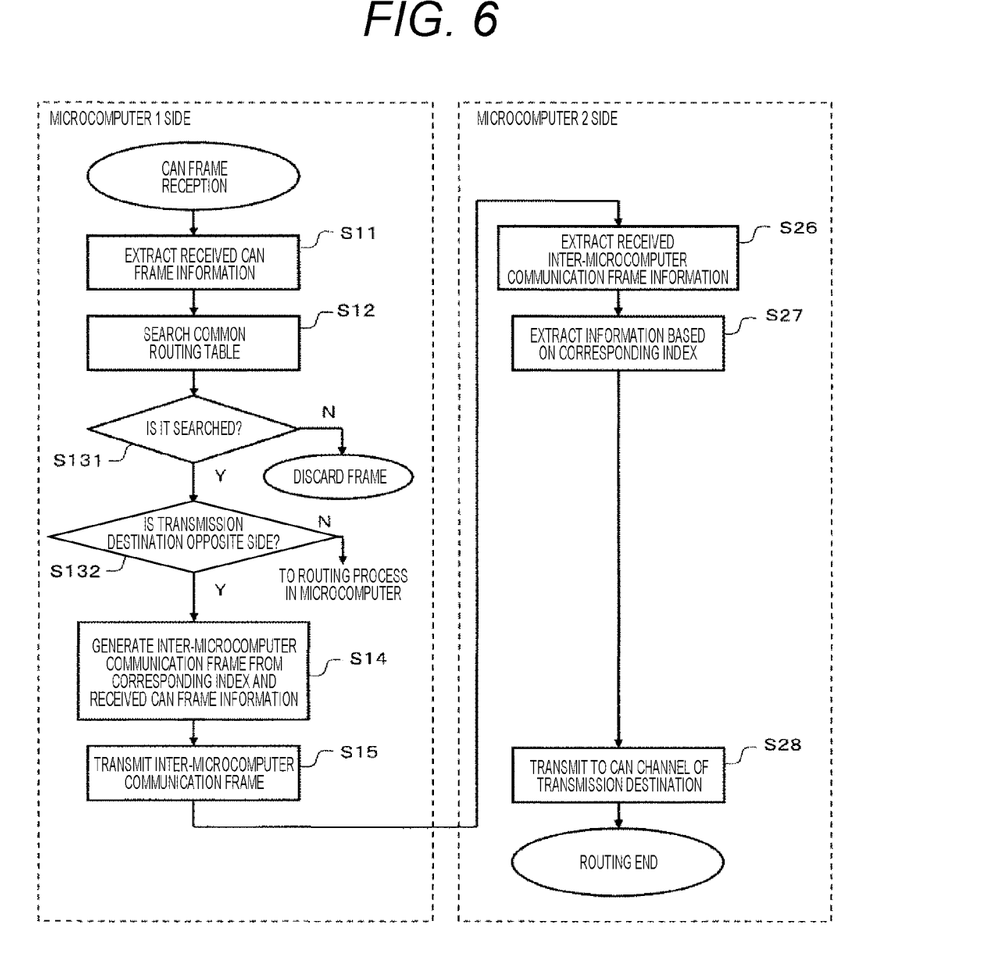
FIG. 6 is a flowchart illustrating a routing processing flow according to the second embodiment.

FIG. 5 is a functional block diagram schematically illustrating the overall configuration of the in-vehicle gateway device 200 according to the second embodiment. FIG. 6 is a flowchart illustrating the routing processing flow in the second embodiment. The second embodiment illustrated in FIG. 5 is different from the first embodiment illustrated in FIG. 1 in that the index-added frame generating unit 14 and the index-added frame information extracting unit 17 of the microcomputer 1 in the example illustrated in FIG. 1 are an information generating unit 14A based on the index and the information extracting unit 17A based on the index.

In addition, the index-added frame generating unit 24 and the index-added frame information extracting unit 27 of the microcomputer 2 in the example illustrated in FIG. 1 are an information generating unit 24A based on the index and an information extracting unit 27A based on the index.

Further, in the example illustrated in FIG. 1, the information from the index-added frame information extracting unit 17 of the microcomputer 1 is output to the routing rule processing unit 13, but in the example illustrated in FIG. 5, the information from the index-based information extracting unit 17A is output to the CAN transmitting unit 18.

Further, in the example illustrated in FIG. 1, the information from the index-added frame information extracting unit 27 of the microcomputer 2 is output to the routing rule processing unit 23, but in the example illustrated in FIG. 5, the information from the index-based information extracting unit 27A is output to the CAN transmitting unit 28.

Further, the difference between FIG. 4 illustrating the routing process flow in the first embodiment and FIG. 6 illustrating the routing process flow in the second embodiment is that Step S23 illustrated in FIG. 4 is omitted from the example illustrated in FIG. 6.

In the second embodiment, as illustrated in FIGS. 5 and 6, in the microcomputer 2, the index-based information extracting unit 27A extracts the transmission channel number that is information based on the index included in the inter-microcomputer communication frame information (for example, information called CAN3) and the received CAN frame information (Step S27). Thus, there is no need to perform the process (Step S23 of FIG. 4) of the routing rule processing unit 23. Therefore, the CAN transmitting unit 28 can be configured to immediately transmit the received CAN frame to CAN3 (Step S28).

The microcomputer 1 also operates similarly to the microcomputer 2 described above.

According to the second embodiment, similarly to the first embodiment, it is possible to realize an in-vehicle gateway device capable of shortening the time required for routing to the CAN bus of the opposite microcomputer side (opposing microcomputer) and reducing the delay of data transfer.

Further, according to the second embodiment, it is not necessary to perform the routing rule process of the routing rule processing unit, so the delay time can be further shortened.

Although the second embodiment described above is an example of adding information based on the index that has been searched and hit, it may be an example of adding the index or information based on the index and transmitting (sending) it to the opposite microcomputer.

Third Embodiment

Next, a third embodiment of the invention will be described.

Similar to the second embodiment, the third embodiment is an example of adding information based on the index searched and hit. However, information is encrypted and transmitted between the microcomputer 1 and the microcomputer 2, and the encrypted information is decrypted on the receiving side.

Figure 11:
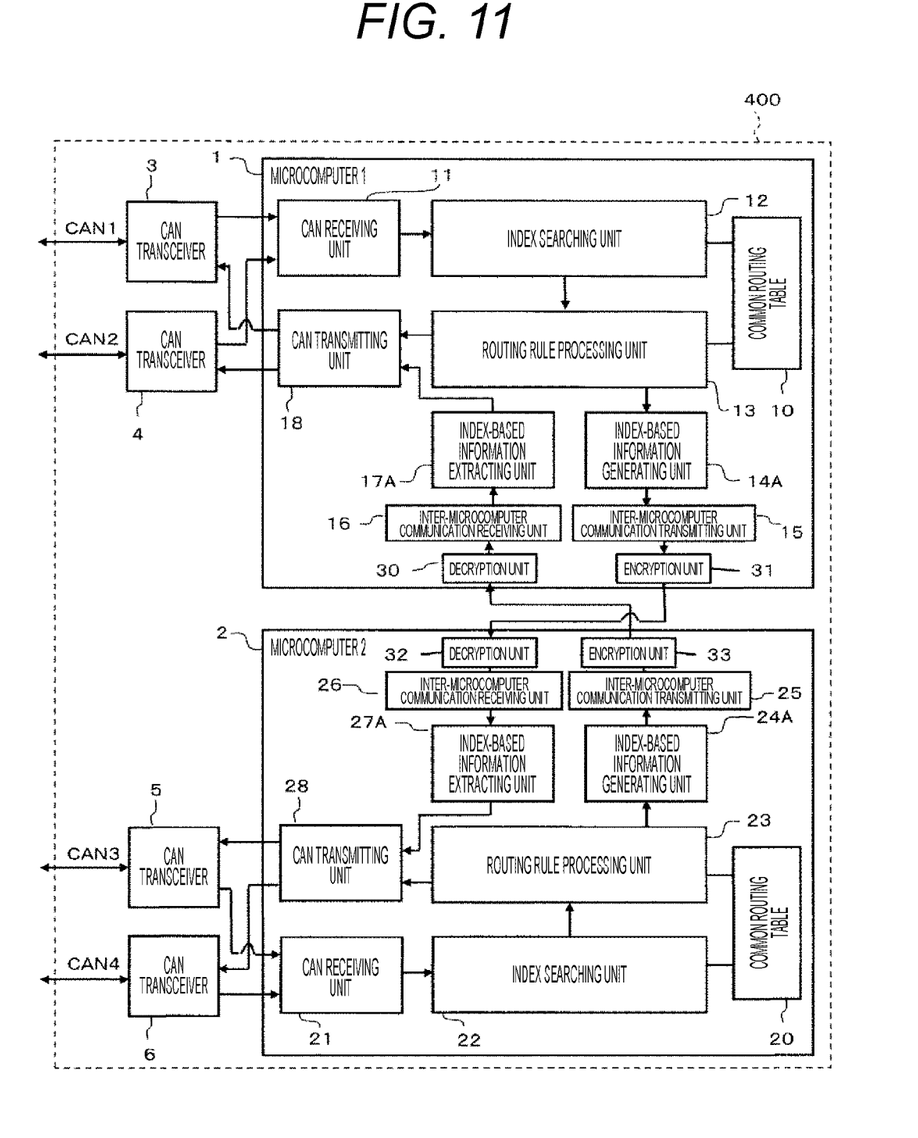
FIG. 11 is a functional block diagram schematically illustrating the overall configuration of an in-vehicle gateway device according to a third embodiment.

FIG. 11 is a functional block diagram schematically illustrating the overall configuration of an in-vehicle gateway device 400 according to the third embodiment.

The difference between the third embodiment illustrated in FIG. 11 and the second embodiment illustrated in FIG. 5 is that in the third embodiment, the microcomputer 1 includes an encryption unit 31 and a decryption unit 30, and the microcomputer 2 also includes an encryption unit 33 and a decryption unit 32.

In FIG. 11, the encryption unit 31 of the microcomputer 1 encrypts the information output from the inter-microcomputer communication transmitting unit 15 and transmits it to the decryption unit 32 of the microcomputer 2.

The decryption unit 32 decrypts the information transmitted from the encryption unit 31 and outputs it to the inter-microcomputer communication receiving unit 26.

Further, the encryption unit 33 of the microcomputer 2 encrypts the information output from the inter-microcomputer communication transmitting unit 25 and transmits it to the decryption unit 30 of the microcomputer 1. The decryption unit 30 decrypts the information transmitted from the encryption unit 33 and outputs it to the inter-microcomputer communication receiving unit 16.

According to the third embodiment of the invention, the same effect as that of the second embodiment is obtained, and the information transmitted and received between the microcomputers 1 and 2 is encrypted. Therefore, the confidentiality of the transmitted information can be ensured.

In the above-described embodiment of the invention, the configuration in which the microcomputer 1 having two CAN channels and the microcomputer 2 having two CAN channels are combined has been described as an example, but the number thereof is not limited. The same process may be performed with a configuration using more CAN channels than in the embodiment.

Further, the above-described example is an example in the case where the invention is applied to an in-vehicle gateway device, but the invention is not limited to in-vehicle use, and may be applied to, for example, a production system in a production plant, a moving body other than a vehicle, or a robot.

In addition, the routing table is expected to increase in size because it has a common routing table for the plurality of microcomputers. However, the increase in size can be suppressed by limiting the contents of the routing table to information transfer rules between microcomputers.

Further, in the above-described first embodiment, it is also possible to add an index and information based on the index and transmit (send) it to the opposite microcomputer.

Further, the invention is not limited to the above embodiments, but includes various modifications. For example, the above-described embodiments of the invention have been described in detail in a clearly understandable way, and are not necessarily limited to those having all the described configurations.

In addition, some or all of the configurations and functions may be realized by an integrated circuit.

In addition, the configurations and the functions may be realized in software such that a processor analyzes and performs a program which realizes each function.

REFERENCE SIGNS LIST 1, 2 microcomputer
3, 4, 5, 6 CAN transceiver
10, 20 common routing table
11, 21 CAN receiving unit
12, 22 index searching unit
13, 23 routing rule processing unit
14, 24 index-added frame generating unit
14A, 24A information generating unit based on index
15, 25 inter-microcomputer communication transmitting unit
16, 26 inter-microcomputer communication receiving unit
17, 27 index-added frame information extracting unit
17A, 27A information extracting unit based on index
18, 28 CAN transmitting unit
30, 32 decryption unit
31, 33 encryption unit
100, 200, 400 in-vehicle gateway device

The invention claimed is:

1. A gateway device comprising:
a first processor communicably connected to a plurality of first communication channels and configured to access and search a first routing table;
a second processor communicably connected to a plurality of second communication channels and configured to access and search a second routing table,
wherein each of the first routing table and the second routing table are a common routing table including a routing rule indicating routing of information and to be performed by at least one of the first processor or the second processor,
wherein the first processor and the second processor are further configured to
transmit and receive information,
in response to one of the first processor and the second processor transmitting the information, determine, by the other of the first processor and the second processor that receives the information, whether the information corresponds to the routing rule, and
in response to determining the information corresponds to the routing rule, perform, by the other of the first processor and the second processor, the routing rule without searching the first routing table or the second routing table, respectively.

2. The gateway device according to claim 1,
wherein the common routing table includes information defined in each of a plurality of indexes, and
wherein the first processor and the second processor transmit and receive information based on the index.

3. The gateway device according to claim 2,
wherein the information based on the index is the index, a routing rule indicated by the index, or the index and the routing rule indicated by the index.

4. The gateway device according to claim 3,
wherein the information based on the index is the index,
wherein the first processor or the second processor that has received the index searches the index of the common routing table to determine whether transmission to the other of the first processor or the second processor is necessary, and
wherein transmission control is performed according to the routing rule indicated by the index.

5. The gateway device according to claim 3,
wherein the information based on the index is the routing rule indicated by the index, and
wherein the first processor or the second processor that has received the routing rule performs transmission control according to the received routing rule.

6. The gateway device according to claim 5,
wherein the first processor and the second processor are further configured to encrypt a signal to be transmitted and decrypt a received encrypted signal.

7. The gateway device according to claim 1,
wherein the common routing table includes at least an information transfer rule of the first processor and the second processor.

8. The gateway device according to claim 1,
wherein the common routing table defines a controller area network ID, a reception channel number, a transmission channel number, and transmission control.

9. The gateway device according to claim 1,
wherein the gateway device is an in-vehicle device.

10. A method for routing information of a gateway device including a first processor and a second processor configured to access and search a common routing table including a routing rule indicating routing of information, the method comprising:
transmitting, by one of the first processor and the second processor, information to the other of the first processor and the second processor;
in response to one of the first processor and the second processor transmitting the information, determining, by the other of the first processor and the second processor that receives the information, whether the information corresponds to the routing rule; and
in response to determining the information corresponds to the routing rule, performing, by the other of the first processor and the second processor, the routing rule without searching the common routing table.

11. The method according to claim 10, further comprising:
receiving, by one of the first processor and the second processor, network frame information;

extracting, by the one of the first processor and the second processor, information from the network frame information;

accessing and searching, by the one of the first processor and the second processor, an index of the common routing table to identify the routing rule indicating routing of the information; and in response to the routing rule indicating routing of the information by the other of the first processor and the second processor, transmitting, by the one first processor or the second processor, a communication frame including the information, the routing rule, and the index.

\* \* \* \* \*